United States Patent [19]

Furtek et al.

[11] Patent Number: 5,362,824

[45] Date of Patent: Nov. 8, 1994

[54] OLEFIN POLYMERIZATION CATALYSTS

[75] Inventors: Allan B. Furtek, Warren; Ronald S. Shinomoto, Edison, both of N.J.

[73] Assignee: Mobil Oil Corporation, Fairfax, Va.

[21] Appl. No.: 991,486

[22] Filed: Dec. 15, 1992

Related U.S. Application Data

[63] Continuation of Ser. No. 808,257, Dec. 13, 1991, abandoned.

[51] Int. Cl.$^5$ ............................................. C08F 4/64
[52] U.S. Cl. ................................... 526/114; 526/119; 526/153; 526/348.2; 526/348.5; 502/159
[58] Field of Search ........................ 526/114, 119, 153

[56] References Cited

U.S. PATENT DOCUMENTS

| | | | |
|---|---|---|---|
| 3,787,384 | 1/1974 | Stevens et al. | 252/429 C |
| 4,076,698 | 2/1978 | Anderson et al. | 526/348 |
| 4,137,547 | 1/1979 | Yamamitsu et al. | 358/8 |
| 4,148,754 | 4/1979 | Strobel et al. | 526/129 |
| 4,302,566 | 11/1981 | Karol et al. | 526/125 |
| 4,670,413 | 1/1987 | Furtek | 502/120 |
| 4,769,429 | 9/1988 | Furtek | 526/129 |
| 4,808,561 | 2/1989 | Welborn, Jr. | 502/104 |
| 4,871,705 | 10/1989 | Hoel | 502/117 |
| 4,876,229 | 10/1989 | Furtek | 502/107 |
| 4,900,706 | 2/1990 | Sasaki et al. | 502/116 |
| 4,921,825 | 5/1990 | Kioka et al. | 502/104 |
| 4,983,694 | 1/1991 | Furtek | 526/125 |
| 5,077,255 | 12/1991 | Welborn, Jr. | 502/104 |
| 5,118,648 | 6/1992 | Furtek et al. | 502/116 |

FOREIGN PATENT DOCUMENTS

| | | |
|---|---|---|
| 283011 | 9/1988 | European Pat. Off. |
| 294942 | 12/1988 | European Pat. Off. |
| 313386 | 4/1989 | European Pat. Off. |

OTHER PUBLICATIONS

Journal of Polymer Science, vol. 17, pp. 2835–2846, Sederel et al., 1973.
Journal of Polymer Science, vol. 6, pp. 2689–2701, Kun et al, 1968.

*Primary Examiner*—Joseph L. Schofer
*Assistant Examiner*—David Wu
*Attorney, Agent, or Firm*—Alexander J. McKillop; Malcolm D. Keen; Marina V. Schneller

[57] ABSTRACT

An improved catalyst for the polymerization of olefins comprising at least one metallocene and at least one aluminoxane co-catalyst supported on a substrate comprising a cross-linked polymeric, porous, resin wherein at least one of the monomers in the resin has at least one pendant functional group which is not reactive under the conditions of the formation of the substrate, and therefore survives the copolymerization which forms the substrate. One specific cross-linked resin is a copolymer of styrene, divinyl benzene and acetoxy styrene.

10 Claims, No Drawings

OLEFIN POLYMERIZATION CATALYSTS

This is a continuation of copending application Ser. No. 07/808,257, filed on Dec. 13, 1991, now abandoned.

This invention is related to the polymerization of olefins, particularly the copolymerization of ethylene with a higher α-olefin to produce a material referred to as linear low density polyethylene (LLDPE). It more particularly refers to a novel catalyst composition which is especially well suited to use for catalyzing this copolymerization, which catalyst is based on at least one Group 4 (IUPAC) transition metal, specifically zirconium and/or hafnium, in combination with an aluminoxane.

BACKGROUND OF THE INVENTION

The polymerization of olefins, particularly ethylene, is well known and has been a widely practiced commercial art for many decades. Catalysts for such polymerization are well known to include Zeigler type catalysts. In the Zeigler type catalyst field, the catalyst is usually made up of a transition metal compound and an alkyl aluminum, which is used as a co-catalyst, sometimes with a magnesium compound as well, usually on a suitable support.

It is conventional commercial practice to polymerize ethylene using a catalyst comprising the reaction product of a titanium halide, suitably titanium tetrachloride; an aluminum alkyl, suitably triethyl or trimethyl aluminum; and a magnesium containing compound, suitably a Grignard reagent, or a magnesium halide salt, all deposited on a suitable substrate particle carrier material, usually defined as a solid, porous material, such as silica, silica-alumina, and combinations thereof. In this field it is common for the catalyst/support particle to become part of the final polymer product and to leave the polymerization reaction zone as a composite with the polymer which has been produced.

In the ethylene polymerization art, it has been well known for a long time to copolymerize ethylene with various higher alpha olefins, such as propylene, butene, hexene and octene, in order to produce linear low density polyethylene (LLDPE). LLDPE resins possess properties which distinguish them from other ethylene polymer resins, such as ethylene homopolymers. Certain of these desirable properties are set forth in U.S. Pat. No. 4,076,698, issued to Anderson et al.

This copolymerization to produce LLDPE is widely commercially practiced. Different manufacturers use different polymerization systems, such as for example: solution, slurry or gas phase polymerization reactions. The gas phase copolymerization reaction is described in U.S. Pat. No. 4,302,566 to Karol et al.

The catalyst which is used in these co-polymerizations is often heterogeneous, and is made by depositing suitable catalytic materials onto the surface of a suitable porous substrate. Since most of the surface area of porous materials exists within the pore structure of these materials, deposition on the surface includes deposition on the internal surface, that is on the internal surface of the pores, as well. As a general proposition, titanium, and sometimes vanadium, are the transition metals of choice. Titanium is usually the commercial norm. In those situations where the catalyst is heterogeneous, the transition metal, suitably titanium, has usually been deposited on a silica substrate. U.S. Pat. No. 4,137,547 to Graff, describes a supported catalyst obtained by treating a support with both an organo-aluminum compound and an organo-magnesium compound followed by contacting this treated support with a tetravalent titanium compound.

As an alternative approach to making a suitable polymerization catalyst, U.S. Pat. No. 3,787,384 to Stevens et al. and U.S. Pat. No. 4,148,754 to Strobel et al. describe a catalyst prepared by first reacting a suitable support (e.g. silica containing reactive surface hydroxyl groups) with an organo-magnesium compound (e.g. a Grignard reagent) and then combining this reacted support with a tetravalent titanium compound.

It should be noted that the traditional wisdom in making catalysts for the copolymerization of ethylene and higher olefins is to use a tri- or a tetra-valent titanium compound, usually in combination with aluminum and/or magnesium. This catalyst is usually assembled in a heterogeneous manner by impregnation of the catalytic materials onto a particulate silica support. There are many references which disclose many different means of maximizing the utility of these catalysts by changes in formulation as well as by specifying the characteristics and the physical properties of the silica substrate, either as to particle size, pore size, pore size distribution, or surface hydroxyl concentration, etc.

In more recent times, it has been discovered that the copolymerization of ethylene and higher olefins, that is the production of LLDPE, can be catalyzed by special zirconium and/or hafnium compounds. These compounds, called metallocenes, have been proposed for use in this service in combination with aluminoxanes, as co-catalysts, both deposited on a silica substrate.

In this regard, reference is made to published European patent applications 294,942 and 313,386 both in the name of Mitsui Petrochemical Company, and to U.S. Pat. No. 4,808,561 to Wellborn, Jr. These references have made various proposals for the formulation of suitably improved catalysts, and many additional publications have been developed dealing with differently formulated and improved catalysts based on these metallocenes, particularly zirconocenes, and aluminoxanes. In this regard, reference is here made to the list of references cited in the above referred to U.S. Pat. No. '561 patent, all of which are incorporated herein by reference.

In most of the published art on heterogeneous catalysts for the polymerization of ethylene alone or in combination with other higher α-olefins, the catalyst has been suggested for use deposited on a substrate particle. In most publications, the substrate particle is reported to be an inorganic refractory oxide, suitably silica, alumina, or silica-alumina.

In some publications, mention has been made of using organic substrates in combination with titanium halide catalysts for olefin polymerization. Reference is here made to U.S.S.R. Author's Certificate numbered 682262 and an application for a Supplement thereto numbered 2,187,995/23-04. In the published version of this application to Supplement, it is said that polyethylene and polypropylene particles, which have substantially inert surfaces, and copolymers of ethylene with vinyl alcohol, which has active surface sites, have been previously known, in combination with titanium, to catalyze this polymerization.

Both of these substrate materials have been indicated by these references to be unsatisfactory for one or more reasons. According to this publication, however, it is noted that styrene homo-and copolymers, notably copolymers with divinyl benzene, can be used as a carrier for a vanadium olefin polymerization catalyst. This carrier material is said to be useful because the vanadium tetra chloride catalyst is reacted with the aromatic rings of the polystyrene, thereby being converted to vanadium trichloride, which is said to be an active catalyst.

The copolymers with divinyl benzene are said to be cross-linked and to have internal pore structures with physical properties which depend on the degree of cross-linking. The reaction of the vanadium tetra chloride with the polystyrene forms a solid phase of the resultant vanadium trichloride on the surface, including within the pores, of the polystyrene. This product is alleged to be combinable with metallorganic compounds, such as aluminum alkyls, to form a highly active catalyst for the stereospecific polymerization of ethylene and propylene.

On this same note, U.S.S.R. application 1,886,351/23-04 shows the use of a titanium trichloride/aluminum alkyl catalyst similarly reacted with and deposited on a polystyrene carrier for the polymerization of propylene. The catalyst is deposited from a titanium tetrachloride form in much the same way as described above for the vanadium tetrachloride.

Reference is here made to published European patent application 283,011, the disclosure of which corresponds to U.S. Pat. No. 4,900,706, assigned to Sumitomo Chemical Company. In this publication, there is disclosed an olefin polymerization catalyst comprising titanium, magnesium and chlorine, and possibly an organo-aluminum co-catalyst, all deposited on an organic polymer carrier. The thrust of this reference is that the carrier should be porous particles having a mean diameter of 5 to 1,000 μm, a pore volume of at least 0.1 ml/g and an average pore radius of 100 to 5,000 Å. It is to be noted that the preferred polymer substrate of this reference includes styrene-divinyl benzene copolymer.

In U.S. Pat. No. 4,808,561, it is mentioned that the support could be organic in nature, such as a resinous support material like a polyolefin. There is generally disclosed in this reference the possibility of using finely divided polyethylene as a support material for a zirconocene-aluminoxane based ethylene polymerization catalyst.

However, in this U.S. Pat. No. '561 patent, the catalyst is more particularly described as having been made by reacting an aluminoxane and a metallocene in the presence of a solid refractory support member. Although, as noted above, in this patent there is a general disclosure that finely divided polyethylene could possibly be used as a suitable substrate for this new type of catalyst, all the specifics of the rest of the disclosure in this patent are directed to the use of silica as the catalyst substrate.

In U.S. Pat. No. 4,921,825, there is a disclosure of using particulate organic polymer supports for ethylene polymerization catalysts. In this patent there is a disclosure in the specific examples of the use of polyethylene powder and of spherical polystyrene powder as supports.

In the body of the specification of this U.S. Pat. No. '561 patent, it is said that the catalyst substrate should be a particulate oxide which should be surface dehydrated such that it is substantially free of absorbed moisture, and therefore be as inert as possible. Beyond this, it is said that the specific particle size, surface area, pore volume, and the number of surface hydroxyl groups are not critical to the utility of the silica as a substrate in the preparation of the zirconocene-aluminoxane catalyst which is suited to use in that invention.

In the past, one of the instant inventors has published, in U.S. Pat. No. 4,876,229, that, in co-polymerization of ethylene with higher α-olefins using catalysts comprising titanium on silica, there is an effect of pore size of the substrate on the effectiveness of the polymerization catalysis. In this regard, it is now generally accepted that, as the pore size of the silica substrate decreases, the molecular weight distribution of the copolymer products decreases. It is also generally accepted that, as the pore size of the silica substrate increases, titanium based catalysts tend to become more effective. That is, as the pore size of the silica substrate increases, the catalyst has higher activity, better co-monomer incorporation, and better hydrogen chain transfer utilization.

In marked contrast to this, where a cross-linked styrene-divinyl benzene particle substrate was used to support a titanium polymerization catalyst, for reasonable pore volumes of at least about 0.5 ml/g, no relationship could be determined between the pore size and pore size distribution of the substrate and the effectiveness of the catalyst for the co-polymerization of ethylene with hexene-1. This is consistent with the disclosures of the above cited Russian references which similarly did not note any such relationship. The content of the above cited Furtek patent, and particularly the examples thereof, fully support the conclusion that, while there may be a relationship between the pore size of a silica substrate and the effectiveness of a titanium catalyst deposited thereon, there does not appear to be any substantial relationship between the pore size of a resinous styrene-divinyl benzene cross-linked copolymer porous substrate and the effectiveness of the same titanium based catalyst deposited thereon.

It is well known that ethylene polymers made using zirconium metallocene-aluminoxane based catalysts are different from ethylene polymers made using tetravalent titanium halide catalysts, even where all of the other polymerization operating parameters are attempted to be held substantially constant. For many applications, the ethylene polymers, particularly the copolymers of ethylene with higher α-olefins, made with a zirconocene/aluminoxane catalyst are preferred.

The instant inventors have simultaneously herewith filed an application for patent directed to an improved catalyst system useful for the polymerization of ethylene, particularly for the co-polymerization of ethylene with higher α-olefins. It is an important aspect of that copending application that the resinous substrate of the catalyst thereof is a co-polymer of monomers which are well suited to being cross-linked during polymerization or after having been polymerized. The cross-linked, co-polymer substrate particles disclosed in the examples of this copending application have substantially no surface functionality. After polymerization and cross-linking, the surfaces thereof are, indeed, inert.

OBJECTS AND GENERAL DESCRIPTION OF THIS INVENTION

It has now been found that it is not always desirable that there be absolutely no surface functionality on the cross-linked resinous substrate particles of an olefin polymerization catalyst comprising at least one metallocene and at least one aluminoxane. It has been discovered that some surface functionality on the cross-linked resinous substrate is desirable, but that this surface functionality must be closely controllable to the purpose intended.

It is therefore an object of this invention to modify an olefin polymerization catalyst system, comprising a porous, resinous cross-linked substrate and a metallocene/aluminoxane catalyst/co-catalyst system on the surface thereof, to provide a controlled amount of functionality on the surface of the substrate.

It is another object of this invention to provide as a polymerization catalyst substrate, a novel cross-linked resinous particles of controlled pore size and particle size having a controlled amount and kind of surface, including the surface area of the substrate that is inside the pore system thereof, functionality.

Other and additional aspects of this invention will become apparent from a consideration of this entire specification, including the claims appended hereto.

In accord with and fulfilling these objects, one aspect of this invention comprises porous, cross-linked resin particles containing pendant functional groups chemically bonded into the polymer system which at least makes up the surface of the particles.

Also in accord with and fulfilling these objects, another aspect of this invention comprises a method of making these functionalized particles by copolymerizing, along with the basic monomers which are being polymerized to make the porous particle, a controlled amount of at least one additional monomer which is copolymerizable with these basic monomers, and which has, in addition to the functional group(s) which copolymerize with the basic monomer(s), at least one functional group which is not substantially copolymerizable with these basic monomers, and which will survive the conditions of copolymerization with the basic monomers to become a functional pendant part of the copolymer product.

It was indicated in the referred to copending application that the monomers, from which the particles which were described therein were to be made, were those which formed porous particles which were not substantially soluble in the monomers, or the polymer products thereof, or the solvents used in the polymerization reaction, or the solvents used in the preparation of the catalyst, that is the deposition of the catalyst components on the catalyst particle substrate. The preferred co-monomers for producing the resinous, cross-linked substrate particles of that invention were said to be styrene and divinyl benzene. The definitions of the basic comonomers is substantially the same in this invention as it was in that copending application, and styrene and divinyl benzene are the preferred basic comonomers for use in this invention as well.

According to this invention, the additional monomers, containing reactive groups which are not substantially reactive with the basic monomers, are included in the monomer mixture which is co-polymerized to produce the desired substrate particle, and are copolymerized along with the basic monomers to form the catalyst substrate particles. It has now been found that these pendant additional functions remain as unreacted functional groups after the formation of the cross-linked resinous particles. Thus, they are quite desirably co-polymerized directly into the cross-linked co-polymer in a manner such that their "non-reactive" functional groups remain dormantly active on the surface of the resultant resinous substrate particles. In this condition, they are readily available for further reaction after the cross-linked resinous catalyst substrate particle has been formed.

According to this aspect of this invention, monomers such as acrylic and methacrylic acids and esters, vinyl ethers, such as methyl vinyl ether, vinyl esters, such as vinyl acetate, vinyl halides, such as vinyl chloride, acrylonitriles, alkylene glycol di-acrylates and methacrylates, such as ethylene and propylene glycol di-acrylates and methacrylates, hydroxy terminated unsaturated acids and esters, such as $\omega$ hydroxy acrylic acid and esters thereof, halo substituted aromatic olefins, such as chloro-styrene or chloro-divinyl benzene, hydroxy substituted styrene or divinyl benzene, vinyl toluene, vinyl pyridene, vinyl benzyl halides, such as vinyl, benzyl chloride, and the like, are quite useful. It is within the scope of this invention to use between about 1 and 30 weight percent of one or more added monomers containing at least one pendant functional group in admixture with the basic monomer(s). In one aspect of this invention, where the basic monomers are styrene and divinyl benzene, this proportion of added monomer is copolymerized with up to about 94% styrene and the remainder, that is at least about 6%, divinyl benzene. Similar proportions of the functional monomer are suitably used with other basic monomers.

The functional co-monomers used in this invention should preferably, but do not necessarily have to, have the same fundamental structure and chemistry as the co-monomers which are being co-polymerized to form the basic porous particle of this invention. Thus, in the situation where aromatic monomers, like styrene and divinyl benzene, are the basic polymerization building blocks, the added functional co-monomer should also preferably have a styrene, or at least an aromatic type, core structure.

Moreover, it is important to the practice of this invention that the functional group of the added monomer, to which this aspect of this invention is directed, should be a group which is substantially inert during the polymerization of the basic monomers. Thus, if the cross-linked polymer which will form the fundamental particle substrate for use in this invention is an olefin addition polymer, the added functional group should be one which does not readily react with olefinic unsaturation under the polymerization conditions. On the other hand, if the fundamental polymer of the particulate substrate is a condensation polymer, such as a polyester or a polyamide, the additional functional group may be an olefinic unsaturation, provided that it does not react to any appreciable extent in the polymerization condensation reaction. In all of these subgenera, the polymerization conditions should be taken into account when selecting the monomers being reacted so as to insure that only those desired functional substituents react in the polymerization, only those desired portions of the polymer react in the cross-linking, and those desired functional groups which need to be retained do not react at all in the basic process of producing the cross-linked resinous porous particle.

The practice of this aspect of this invention has provided another degree of freedom in controlling the properties of the ethylene polymerization products produced using catalysts of the metallocene/aluminoxane/resinous substrate type. By the addition of a functional co-monomer in the production of the cross-linked resinous substrate, it has been possible to provide means to further be able to control the molecular weight of the polymer products. Indeed, where the pendant functional group is an acetoxy group; where the catalyst comprises a zirconocene, an aluminoxane, and an aluminum hydrocarbyl on a cross-linked, porous, resinous styrene-divinyl benzene substrate; where the catalyst has been made in substantially the same way and with the same proportions of constituents; and where the ethylene polymerization has been carried out under the substantially the same conditions, the polymer product produced had a melt index about three (3) orders of magnitude higher than where the catalyst substrate did not have a functional monomer copolymerized thereinto.

According to this invention, it is preferred that the metallocene is cyclopentadienyl zirconium chloride in a preferred proportion of about 0.025 to 0.65 mmol/gram of support; that the aluminoxane is an alkyl aluminoxane in a preferred proportion of about 0.1 to 10 mmol Al/gram of support; and that the hydrocarbyl aluminum is an alkyl aluminum in a preferred proportion of about 0.1 to 6 mm Al/gram of support. The alkyl groups which are suited to use in the aluminoxane portion of this composition are suitably groups having about 1 to 6 carbon atoms per alkyl group, preferably about 1 to 3 carbon atoms per alkyl group, most preferably methyl. The hydrocarbyl group portion of the hydrocarbyl aluminum portion of the catalyst of this invention is suitably made up of at least one aliphatic group having up to about 8 carbon atoms, preferably up to about 6 carbon atoms, and most preferably a branched alkyl group such as isoprenyl or isobutyl.

In a preferred formulation, the divinyl benzene comprises about 30% by weight of the cross-linked resinous substrate, the styrene comprises about 55%, and functional added monomer is p-acetoxy styrene which comprises about 15% thereof. The aluminoxane is methyl aluminoxane, and the hydrocarbyl aluminum is isoprenyl aluminum.

SPECIFIC EXAMPLES OF THIS INVENTION

In the following examples, all parts and percentages are by weight unless specifically recited to be on some different basis. These examples are intended to be illustrative of this invention and in support of the patentability thereof, but are not to be taken as in any way limiting on the scope of this invention.

EXAMPLES 1–3

A first catalyst was prepared from a first substrate of styrene-divinyl benzene copolymer, containing 80% styrene and 20% divinyl benzene, in particles of about 30 μm in average size, with a pore volume of 1.9 g/cc, and an average pore diameter of 1050 Å, had deposited thereon a catalyst composed of 0.068 mmol of (cyclopentadienyl) zirconium dichloride/gram of support; 1.3 mmol, based on aluminum, of methyl aluminoxane/gram of support; and 1 mmol, based-on aluminum, of isoprenyl aluminum/gram of support.

A second catalyst was prepared from a second substrate, which was identical to the first substrate except that it additionally contained 15% p-acetoxy styrene as an added monomer. After polymerization, the acetoxy groups were hydrolyzed to hydroxy groups with hydrazine. The physical properties of the second substrate were substantially identical to the physical properties of the first substrate. The catalyst deposited on this second substrate was substantially identical to the catalyst deposited on the first substrate.

A third catalyst was prepared from a third substrate, which was identical to the second substrate in that it also additionally contained 15% p-acetoxy styrene as an added monomer. The acetoxy groups of this third catalyst substrate were not hydrolyzed to their hydroxy analog. The physical properties of the third substrate were substantially identical to the physical properties of the first and second substrates. The catalyst deposited on this third substrate was substantially identical to the catalyst deposited on the first and second substrates.

The catalysts were each admixed with an methyl aluminoxane solution (2 cc of 5 weight percent in toluene), which mixture was added to 2 liters of a monomer mixture of 40 mol % ethylene and 60 mol % hexene-1 in heptane, and the contact maintained for 1 hour at 85° C. The productivity of the catalyst, as well as the melt index of the resulting polymer were determined by conventional testing means. The following table sets forth the relationship of the results of these examples so obtained.

TABLE 1

| | | | |
|---|---|---|---|
| FUNCTIONALITY AMOUNT | NONE | 15% | 15% |
| FUNCTIONALITY TYPE | NONE | HYDROXY | ACETOXY |
| PRODUCTIVITY g.g cat/hr/100 psi ethylene | 810 | 490 | 560 |
| MELT INDEX | 1.9 | 430 | 1500 |

It will be clear from a consideration of these data, that the polymer product produced using a cross-linked resinous substrate with added functional monomer copolymerized therein is quite different from the polymer produced under substantially identical conditions without the added functional monomer in the substrate. This is wholly unexpected. There does not appear to be anything in the ethylene polymerization art which would suggest this possibility.

What is claimed is:

1. An olefin polymerization process comprising polymerizing at least one polymerizable lower olefin, under polymerization conditions, with a polymerization catalyst comprising at least one metallocene and at least one aluminoxane dispersed on the surface of a resinous substrate comprising a cross-linked copolymer of about 30% divinyl benzene, about 55% styrene, and about 15% of acetoxy or hydroxy styrene.

2. An improved olefin polymerization process as claimed in claim 1 wherein said aluminoxane is present in said catalyst in a proportion of about 0.1 to 10 mmol of aluminum/gm of support.

3. An improved olefin polymerization process as claimed in claim 1 wherein said metallocene comprises at least one metal selected from the group consisting of zirconium and hafnium.

4. An improved olefin polymerization process as claimed in claim 1 wherein said aluminoxane comprises an alkyl aluminoxane.

5. An improved olefin polymerization process as claimed in claim 1 wherein said catalyst further contains at least one hydrocarbyl aluminum.

6. An improved olefin polymerization process as claimed in claim 5 wherein said hydrocarbyl is alkyl.

7. An improved olefin polymerization process as claimed in claim 6 wherein said alkyl group has about 1 to 6 carbon atoms.

8. An improved olefin polymerization process as claimed in claim 5 wherein said hydrocarbyl aluminum comprises about 0.1 to 6 mmol/g of support.

9. An improved olefin polymerization process as claimed in claim 8 wherein said hydrocarbyl group comprises a branched group.

10. An improved olefin polymerization process as claimed in claim 8 wherein said hydrocarbyl group is isoprenyl or isobutyl.

* * * * *